United States Patent [19]

Vook et al.

[11] Patent Number: 5,625,882
[45] Date of Patent: Apr. 29, 1997

[54] POWER MANAGEMENT TECHNIQUE FOR DETERMINING A DEVICE MODE OF OPERATION

[75] Inventors: Frederick W. Vook; Mark Demange, both of Schaumburg; Hungkun Chang, Hoffman Estates; William K. Doss, Lake In The Hills, all of Ill.

[73] Assignee: Motorola, Inc., Schaumburg, Ill.

[21] Appl. No.: 514,168

[22] Filed: Aug. 11, 1995

Related U.S. Application Data

[63] Continuation of Ser. No. 204,034, Mar. 1, 1994, abandoned.

[51] Int. Cl.$^6$ .................................................. H04B 7/00
[52] U.S. Cl. .................... 455/38.3; 455/343; 455/54.2
[58] Field of Search ........................ 455/38.3, 343, 455/89, 53.1, 54.1, 54.2, 51.1, 69, 70; 375/354; 370/100.1

[56] References Cited

U.S. PATENT DOCUMENTS

| 4,369,443 | 1/1983 | Giallanza et al. |
| 4,449,248 | 5/1984 | Leslie et al. |
| 4,584,708 | 4/1986 | Eilers et al. |
| 4,860,005 | 8/1989 | DeLuca et al. |
| 5,095,308 | 3/1992 | Hewitt ................ 455/343 |
| 5,128,938 | 7/1992 | Borras et al. |
| 5,214,793 | 5/1993 | Conway et al. |
| 5,241,542 | 8/1993 | Natarajan et al. ........ 455/343 |
| 5,355,518 | 10/1994 | Kindinger et al. ....... 455/38.3 |
| 5,382,949 | 1/1995 | Mock et al. ............ 455/343 |

OTHER PUBLICATIONS

IEEE 802.11 Wireless Access Method and Physical Specification, Nov. 1993, Distributed Foundation Wireless MAC, Belanger, Ennis and Diepstraten, pp. 1–72.

Primary Examiner—Reinhard J. Eisenzopf
Assistant Examiner—Doris To
Attorney, Agent, or Firm—Val Jean Hillman

[57] ABSTRACT

A power management technique for use in an wireless communication system having a service access point and a plurality mobile battery powered user devices, user devices in communication with each other and with the access point, power management technique for determining when a user device may transition from an active mode of operation to a sleep mode of operation and further for determining when a user device in the sleep mode of operation should transition to the active mode of operation.

12 Claims, 7 Drawing Sheets

TABLE 1

| CLOCK CYCLE | LSFR STATE 11 | 12 | 13 | 14 |
|---|---|---|---|---|
| 0 | 1 | 0 | 0 | 0 |
| 1 | 0 | 1 | 0 | 0 |
| 2 | 0 | 0 | 1 | 0 |
| 3 | 1 | 0 | 0 | 1 |
| 4 | 1 | 1 | 0 | 0 |
| 5 | 0 | 1 | 1 | 0 |
| 6 | 1 | 0 | 1 | 1 |
| 7 | 0 | 1 | 0 | 1 |
| 8 | 1 | 0 | 1 | 0 |
| 9 | 1 | 1 | 0 | 1 |
| 10 | 1 | 1 | 1 | 0 |
| 11 | 1 | 1 | 1 | 1 |
| 12 | 0 | 1 | 1 | 1 |
| 13 | 0 | 0 | 1 | 1 |
| 14 | 0 | 0 | 0 | 1 |
| 15 | 1 | 0 | 0 | 0 |
| 30 | 1 | 0 | 0 | 0 |
| 45 | 1 | 0 | 0 | 0 |

POWER MANAGEMENT TECHNIQUE FOR DETERMINING A DEVICE MODE OF OPERATION

This is a continuation of application Ser. No. 08/204,034, filed Mar. 1, 1994 and now abandoned.

FIELD OF THE INVENTION

This invention is directed to a power management strategy for use with a network of battery powered communication devices. This invention is especially suited for use in a radio frequency (RF) communication system.

BACKGROUND OF THE INVENTION

In a wireless communication system wherein a plurality of mobile battery powered devices employ wireless techniques in order to communicate with each other, extending the battery life i.e., extending the time period between battery recharges is of key importance to continued communications. As will be appreciated, various subsystems of a battery powered device may place heavier demands upon battery resources than others. For example, when the battery powered device employs a radio frequency (RF) transceiver to transmit and receive data, the transceiver consumes significant quantities of battery power, and hence, adversely impacts overall battery life. It would be extremely advantageous therefore to provide a power management scheme capable of minimizing the power consumption by battery powered devices in a wireless communication system.

SUMMARY OF THE INVENTION

Figure 1:
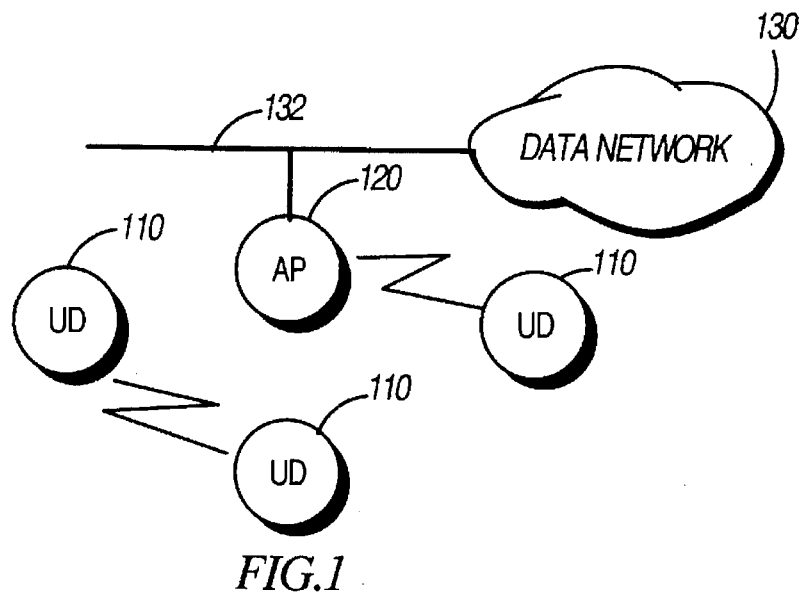
FIG. 1 illustrates in block diagram form a wireless communication system anticipated by the present invention.

Briefly described, the present invention is a power management technique or strategy for use in a wireless communication system having a service access point and a plurality of mobile battery powered devices, said devices being in communication with each other and with the access point via communication channels, for determining when a device may transition from an active mode of operation to a sleep mode of operation. The power management strategy employs processing steps including, but not limited to, initializing an awake counter that has a maximum count value. Determining a time-out value for the awake counter and then incrementing the counter while a device is in the active mode of operation. Upon the counter reaching the time-out value, determining whether various sleep mode conditions are satisfied and when true, permitting the device to enter the sleep mode of operation.

In accordance with yet another aspect of the power management strategy of the present invention, processing steps for determining when a device should transition from the sleep mode of operation to the active mode of operation include, but are not limited to, establishing a wake-up schedule identifying a plurality of synchronization signals to be monitored by a device, calculating an arrival time for each synchronization signal identified in the schedule as a function of their separation in time and upon the arrival of each of said synchronization signals as identified in the schedule, causing the device in the sleep mode to transition to the active mode of operation in order to monitor the synchronization signal's content.

DETAILED DESCRIPTION OF A PREFERRED EMBODIMENT

Before describing an embodiment of the present invention, it is believed that an overview will aid in the reader's understanding. The purpose of the power management scheme of the present invention is to minimize the power consumption at a wireless battery powered communications device such as a notebook computer, lap-top computer, personal digital assistant (PDA) and the like which employ wireless (e.g., radio and infrared) transceiver in order to transmit and receive information. To achieve this goal, the wireless device is designed to operate in two power consumption states: the "sleep" mode and the "active" mode of operation.

During the sleep mode, only the basic device functions such as system clock, timers, interrupts, etc. are operational, as power to the rest of the device hardware is turned off. In particular, the wireless transceiver receives no power, thus, the device can neither transmit or receive information, and, therefore cannot perform any communications activities while asleep. When the device successfully transitions to the active mode of operation, however, full communicating capabilities are restored.

The power management strategy of the present invention defines how and when a device may and should alternate between the sleep and active modes, thereby attempting to balance existing trade-offs between power consumption and channel access performance.

FIG. 1 illustrates in block diagram form a wireless communication system anticipated by the present invention comprising a wireless LAN 100. For the purpose of this discussion, wireless LAN 100 includes a system access point (AP) 120 which utilizes RF communications to communicate with a plurality of user devices 110 such as portable computers, lap-top computers, personal digital assistants (PDAs) and the like. AP 120 is connected to data network 130 by channel 132 which may include, but is not limited to wires or optical links.

AP 120 controls communication within the illustrated network by passing information to and from data network 130 and the plurality of user devices 110. Individual devices 110 are capable of direct communications, however, without support by AP 120. Data network 130 may consist of an Ethernet network, a Token Ring network or any other of the well known data network.

Figure 2:
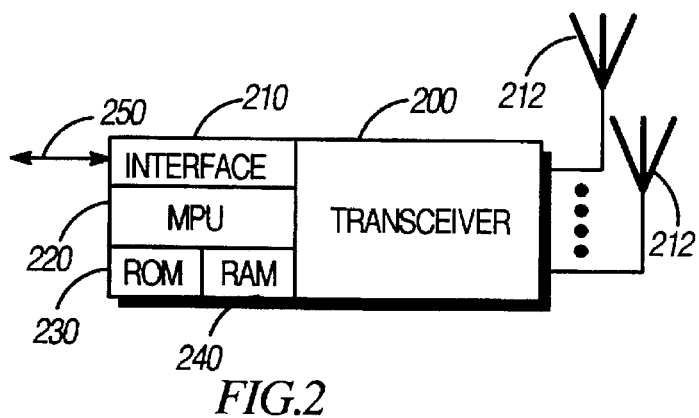
FIG. 2 illustrates a block diagram of a structure common to both the access point and a user device of FIG. 1.

FIG. 2 illustrates a block diagram of a structure common to both access point 120 and user devices 110 of FIG. 1. A wireless transceiver 200 utilizes digital data to modulate a carrier signal to transmit the desired data and its receiver converts received RF signals into corresponding digital data. In accordance with the present invention, transceiver 200 is an RF transceiver. Notwithstanding, it may comprise any other well known wireless communication technology such as, but not limited to infrared (IR) technologies.

Transceiver 200 employs one or more antennas designated 212 for communicating with another device 110 or AP 120 as shown in FIG. 1. A microprocessor 220 operates under the control of an operating system contained in read only memory 230 and utilizes random access memory 240 to control inbound and outbound data traffic carried by path 250 and transceiver 200. An interface 210 may consist of line drivers and input/output buffers and registers as is conventional in microprocessor systems. The path 250 corresponds to communication channel 132 of FIG. 1 where the embodiment is utilized as AP 120 and corresponds to the connection to a terminal device where the embodiment is utilized as a device 110. The microprocessor operation relating to power management is explained in more detail below.

Figure 3:
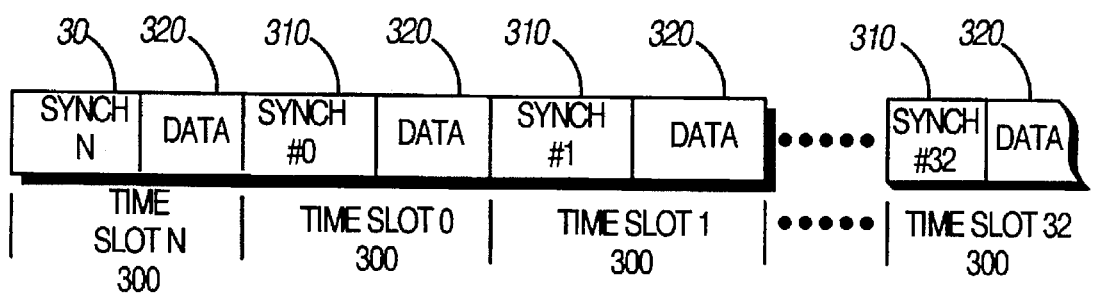
FIG. 3 depicts the structure of a transmission channel for use within the communication system of FIG. 1.

FIG. 3 depicts the structure of a transmission channel for use within the communication system of FIG. 1. In the system of FIG. 1, the information passed between devices 110 and AP 120, is communicated during time slots 300. Each time slot 300 typically contains a Synch interval 310 and a data interval 320. The Synch interval 310 contains a Synch Signal generated by AP 120, and destined for all devices 110 in the AP's zone of RF coverage. In accordance with the preferred embodiment each Synch Signal may comprise synchronization information, control data, and an indication to a particular destination device 110 that AP 120 has information ready for transmission to that device. Each Synch Signal will also contain an identification number, numbered from 0–N, which is used to distinguishes one Synch Signal from the next and may also be used to distinguish one time slot from the next. Data interval 320 is allocated for data packets which are communicated to and from the plurality of devices 110 and AP 120. It should be appreciated by those skilled in the art that devices 110 and AP 120 may utilize any of the well known channel access protocols, such as, but not limited to carrier sense multiple access (CSMA) to transmit data packets during the data interval 320.

Of note, each time slot 300 is of known duration. This permits devices 110 to readily calculate the boundaries for any time slot 300 based upon the common time reference established by Synch Signals 0–N, receipt of the Synch Signal ID and each respective time slot's duration. In accordance with the preferred embodiment N is 255. Thus, there are a total of 256 time slots in the repeatable sequence depicted in FIG. 3.

Figure 4:
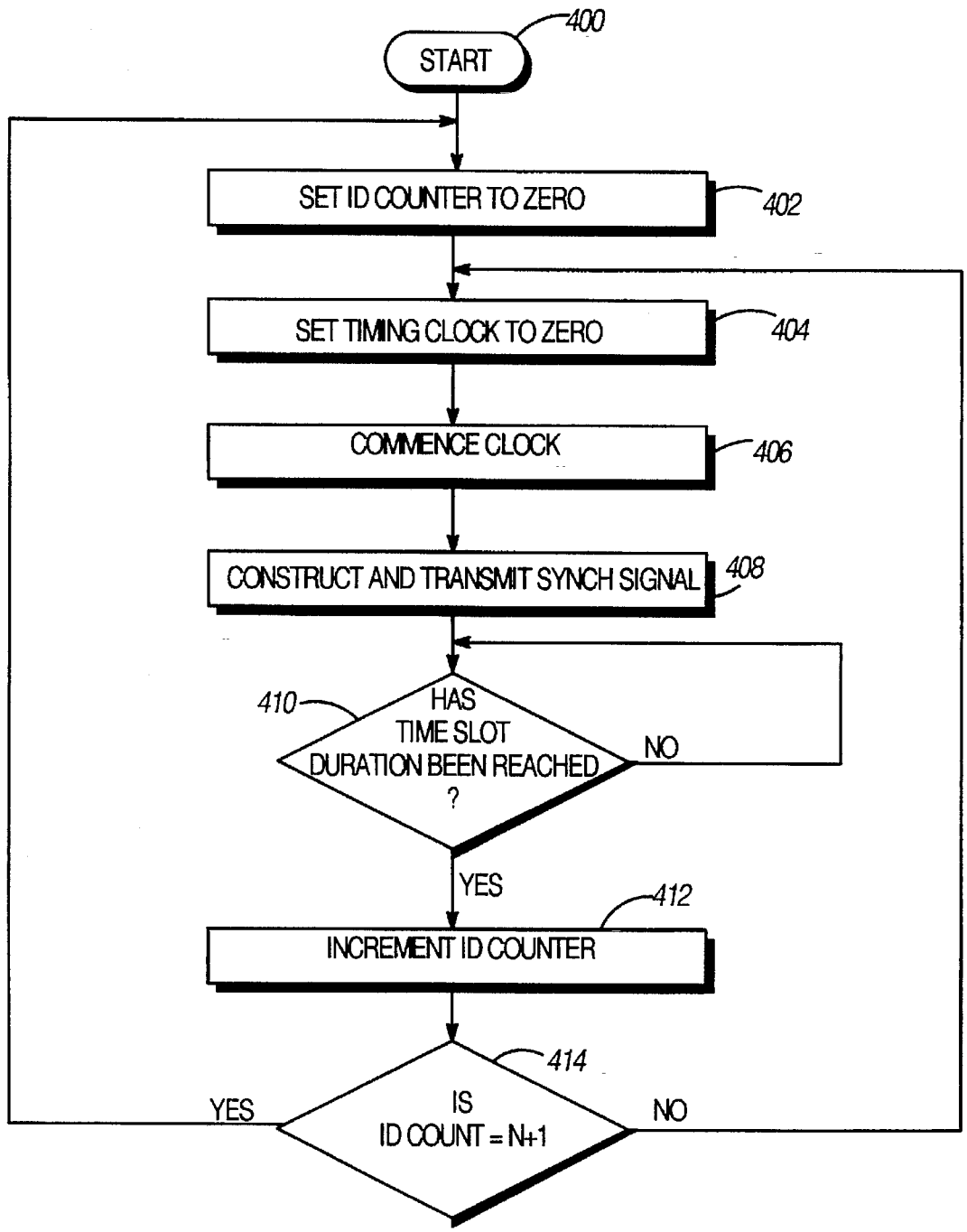
FIG. 4 is a flow chart diagram illustrating the steps performed by the access point of FIG. 1 in order to generate Synchronization Signals for transmission to the user devices of FIG. 1.

FIG. 4 is a flow chart diagram illustrating the steps performed by MPU 220 of access point 120, under the direction and control of a program instruction set stored in ROM 230 of FIG. 2, in order to generate the Synch Signals of FIG. 3 in accordance with the present invention. Commencing at start block 400, flow proceeds to block 402 where a Synch Signal ID COUNTER is set to zero. At blocks 404 and 406 a Timing CLOCK is set to zero and then continually clocked. From block 406, flow proceeds to block 408 where AP 120 constructs a Synch Signal 310, places therein the ID COUNTER count and commences transmission of the constructed Synch Signal and any control data associated therewith.

At block 410, a check is performed to determine whether the time slot duration of a time slot 300 of FIG. 3 has been reached. If not, flow branches back to block 410 until the proper time has elapsed. From block 410, flow proceeds to block 412 where the ID COUNTER count is incremented. From block 412, flow then proceeds to block 414 where a check is performed to determine whether the ID COUNTER count is equal to N+1, where N is the maximum number of allowable time slots 300 in FIG. 3. When the ID COUNTER count is equal to N+1, flow branches back to block 402 where the ID COUNTER count is set back to zero. Otherwise, flow branches back to block 404, where the process continues.

Figure 5:
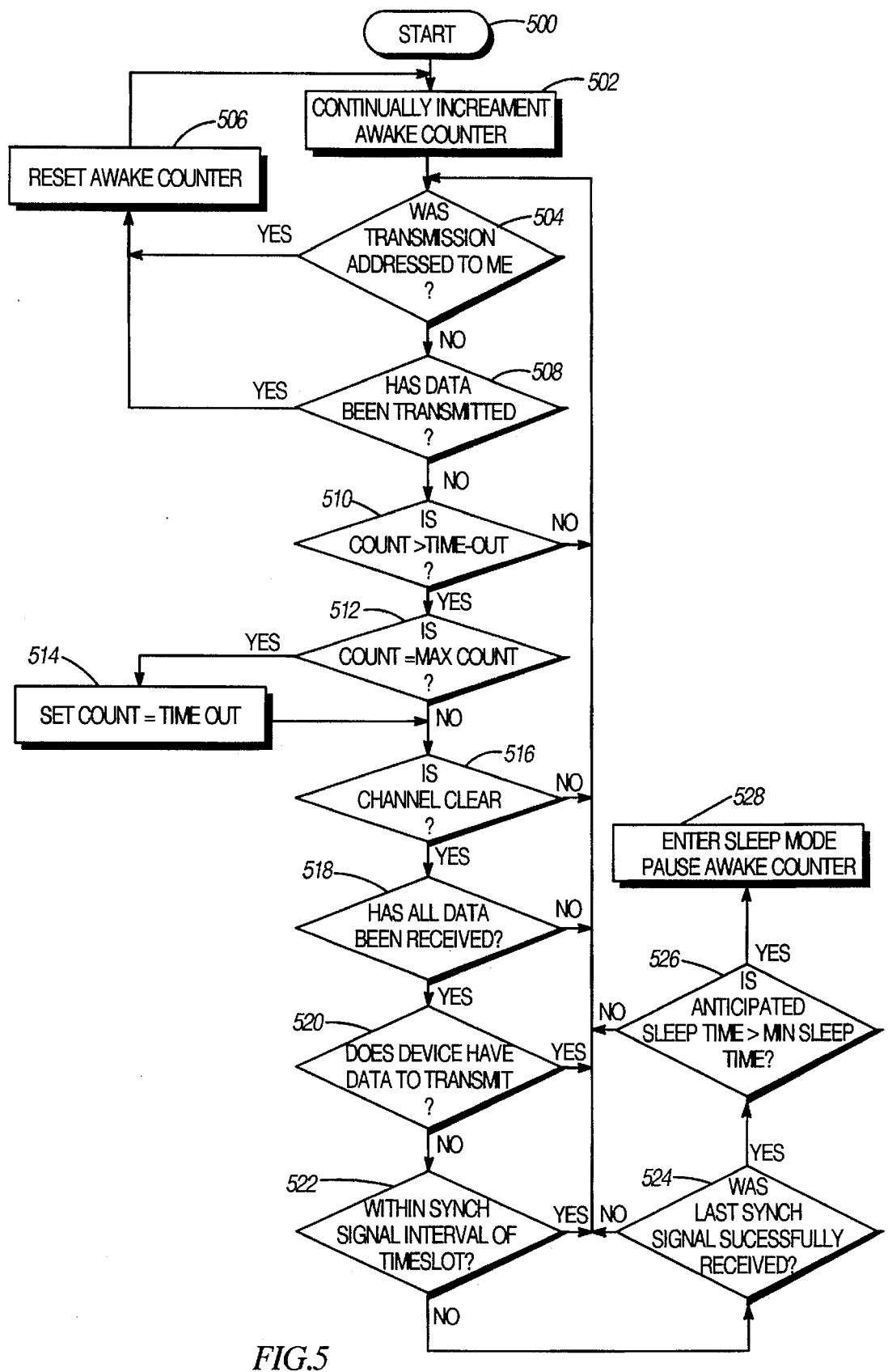
FIG. 5 is a flow chart diagram illustrating the steps performed by a user device during a transition from the active mode of operation to the sleep mode of operation.

FIG. 5 is a flow chart diagram illustrating the steps performed by MPU 220 of user device 110, while under the direction and control of a program instruction set stored in ROM 230 of FIG. 2, in order for the user device 110 to transition from the active mode of operation to the sleep mode of operation. Commencing at start block 500, it is assumed that the device in question is already awake. If the device is waking for the first time, it will be necessary to initialize an awake counter at block 501 which is thereafter continually incremented at block 502 while the device is in the active mode. During said active operation the device will receive transmissions in the normal course at block 504. In addition, a check is performed to determine whether the received transmission was addressed to the device in question. Assuming it was, flow proceeds to block 506 where the counter is set to zero and flow branches back to block 502.

If the transmission was not addressed to the receiving device, flow proceeds to block 508 where a check is performed to determine whether the device in question has recently transmitted data. If so, flow proceeds to block 506 where the awake counter is set to zero and flow branches back to block 502. From the foregoing, it should be appreciated that each time the device uses the transmitter portion of transceiver 200 or receives a transmission addressed to the device, the awake counter is reset to zero. This has the effect of keeping the device in the active mode of operation until a specified period of transceiver inactivity has elapsed.

Assuming no transmission and/or receptions have occurred, flow proceeds to block 510 where a check is made to determine whether the counter's count is greater than a value of time-out. In accordance with the present invention, the time-out period is set such that after a period of transceiver inactivity, if certain conditions are met, the device may then and only then transition into the sleep mode of operation. In accordance with the preferred embodiment, the time-out period is set to 20 milliseconds or the equivalence of a timeslot 300 duration.

Assuming the count is less than the value of time-out, flow continually branches back to block 504 and the device remains in the active mode. If no transmissions or reception cause the counter to be reset, time-out will eventually be reached. Flow will then proceed from block 510 to block 512 where a check is performed to determine whether the counter has reached its maximum count value. If so, flow proceeds to block 514, where the count is set to the value of time-out, and flow proceeds back to block 516. This operation is performed so that the counter is not inadvertently reset to zero, thereby forcing the device to remain in the active mode, even though time-out has been satisfied.

Of course, if the maximum count has not been reached, flow proceeds to block 516 where a check is performed to determine whether the device observes a clear communications channel. This step equates to the device hearing no traffic on the channel depicted in FIG. 3. If the channel is clear, flow proceeds to block 518, else flow branches back to block 504.

At block 518 a check is performed to determine whether or not all data anticipated for the device in question has been received. First a check is performed to determine whether all packet fragments associated with the data received at block 504 have been received. The fragmentation of data to be transmitted over narrow bandwidth communications channels is well known in the art and will not therefore be discussed in detail. Suffice it to say, however that the present invention anticipates the need to perform data packet fragmentation during the delivery of data over wireless communications channels. In accordance, if all packet fragments have been received at block 518, the device may continue moving towards the sleep mode, else it must remain in the active mode until all fragmented data has been accounted for.

Next, a check is performed to determine whether the device has received an indication that there is additional information stored at the AP and ready for delivery to the device. In such instance, it would be totally inappropriate to let the device lapse into the sleep mode prior to the delivery of the stored information. Of note, the above-mentioned indication is communicated to the device during the reception of a Synch Signal as described in association with FIG. 3. Within each Synch Signal 310, there is a bit field. This bit field is used to provide status to destination devices. An example of the type information communicated to a destination device is the fact that additional packets are stored at the AP and destined for delivery.

Assuming all fragments have been transmitted and received by the device in question and further assuming AP 120 has no additional data to be transmitted to the device, flow proceeds from block 518 to block 520 where a check is performed to determine whether the device itself has data to transmit. If, so, the device will remain in the active mode so that said data may be transmitted. If no data requires transmission, flow then proceeds to block 522, where a check is performed to determine whether the device is currently within the Synch Signal portion 310 of a time slot 300 of FIG. 3. If so, it will remain in the active mode in order to monitor and decode that Synch Signal, else flow will proceed to block 524.

At block 524, a check is performed to determine whether the device successfully received the last Synch Signal transmission. If not, it is assumed that radio interference or some other disturbance caused this reception error and the device is not permitted to transition to the sleep mode. This step assures the device attains current AP packet delivery status prior to entering the sleep mode. If, on the other hand, the device successfully received the last Synch Signal transmission, flow proceeds to block 526.

At block 526, a check is performed to determine how much time will elapse before the device must necessarily wake-up (i.e., transition to the active mode), and whether this anticipated sleep period is greater than a predefined minimum sleep period. If so, the device will enter the sleep mode at block 528 and the awake counter is inhibited, else flow will branch back to block 504 and the device will remain in the active mode of operation. This condition is employed in order to provide a damping function which discourages rapid and/or frequent device state transitions.

In order to coordinate operation, each device 110 maintains an event schedule. Of note, AP 120 likewise maintains substantially similar event schedules for each device 110 registered within the AP's zone of RF coverage. An event schedule determines which of the Synch Signal transmissions of FIG. 3, a device 110 is required to monitor. Event scheduling may be as simple as maintaining a Synch Signal rate value such as, for example, the integer 3, or any integer value between 1 and N. In accordance with the example above, the device will enter the active mode in order to monitor every third Synch Signal transmission of FIG. 3.

In accordance with the preferred embodiment, N is 255 and the Synch Signal rate is selected in accordance with the following equation.

$$\text{Rate}=2^x, \text{ where x is an integer } 0 \leq x \leq 8 \qquad 1)$$

When the value of N is other than 255, equation 1 is expressed as:

Rate=$2^x$, where x is an integer $0 \leq x \leq Z$, where $Z=\log_2 (N+1)$ and $N+1$ is an integer power of 2.

As will be appreciated by those skilled in the art the above described relationship remains consistent even as the rate function changes. For example, if Rate=$3^x$ where x is an integer $0 \leq x \leq Z$, then $Z=\log_3 (N+1)$ where $N+1$ is an integer power of 3.

Since each time slot 300 of FIG. 3 is of known duration, it is relatively simple to estimate when a device must next awake in order to monitor a particular Synch Signal 310.

In accordance with yet another embodiment, the event schedule may be determined by utilizing a Pseudo random (PN) code generator, such as, but not limited to a Linear Feedback Shift Register (LFSR), to generate a PN signal which is employed to determine which of the Synch Signals of FIG. 3 are to be monitored. As is known in the art, an LFSR generates a PN signal which is a binary signal comprising a plurality binary symbols, which appear to be random. In reality, a PN signal is not random at all; it is a deterministic, periodic signal whose periodicity is dependent upon the number of stages within the LFSR, the feedback taps, and the LFSR's initial conditions.

Figures 9, 10:
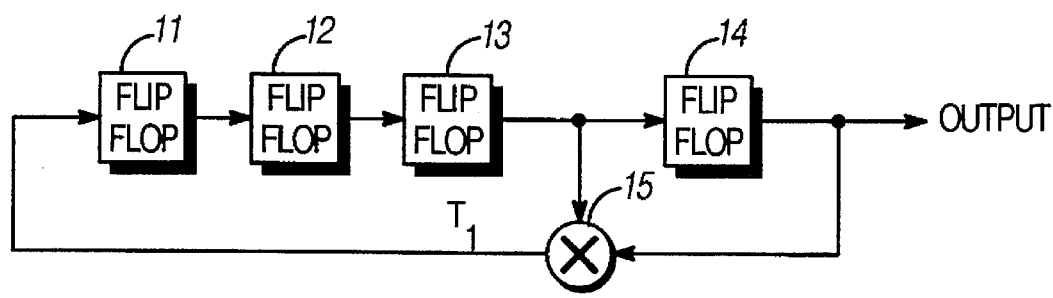
FIG. 9 depicts a simplistic representation of a Linear Feedback Shift Register (LFSR)
FIG. 10 is a table representing a portion of the output of the LFSR of FIG. 9.

FIG. 9 depicts a simplistic representation of an LFSR 900. Mathematically, LFSR 900 defines a fourth degree polynomial, comprising four stages 11–14, with feedback signal $T_1$, which performs an exclusive-or operation on the output stage 13 and 14 and feeds that operation back to the input of stage 11. It will be appreciated by those skilled in the art that LFSR 900 is a simplistic model of a PN signal generator. This example was selected to primarily to show that an LFSR of the Xth degree is ultimately periodic in $2^x-1$ bits, as shown in FIG. 10.

In the preferred embodiment, LFSR 900 employs an 256 stage shift register, providing a 256 degree polynomial. The output signal from said LFSR is employed as the event schedule of the present invention. In this effort, each PN signal symbol is related to a Synch Signal 310, numbered 0–255. Based upon the output signal generated by LFSR 900, the device will then enter the active mode to monitor those Synch Signals 310 that correspond to each PN signal symbol that, for example, has the binary state of logic 1. In the alternative, the event schedule could permit the device to enter the active mode to monitor those Synch Signals 310 that correspond to PN signal symbols that have, for example, the binary state of logic 0. As will be appreciated, equation 1 above could be applied to the LFSR output to further delimit when the device in question must enter the active mode.

It will further be appreciated by those skilled in the art that other binary shift register sequences and sequence generators may be substituted for the one described herein above without departing from the spirit of the present invention. Such other binary shift register sequences include, but are not limited to Gold codes, Kasami sequences and the mechanisms for generation thereof as known in the art.

Referring back to FIG. 5, after having determined which Synch Signals to monitor and having calculated when the device must next awake, i.e., an anticipated sleep period, this time is compared to a predefined minimum sleep period. If the anticipated sleep period is greater than the minimum sleep period, the device is permitted to enter the sleep mode at block 528. Otherwise the device remains in the active mode.

Figure 6:
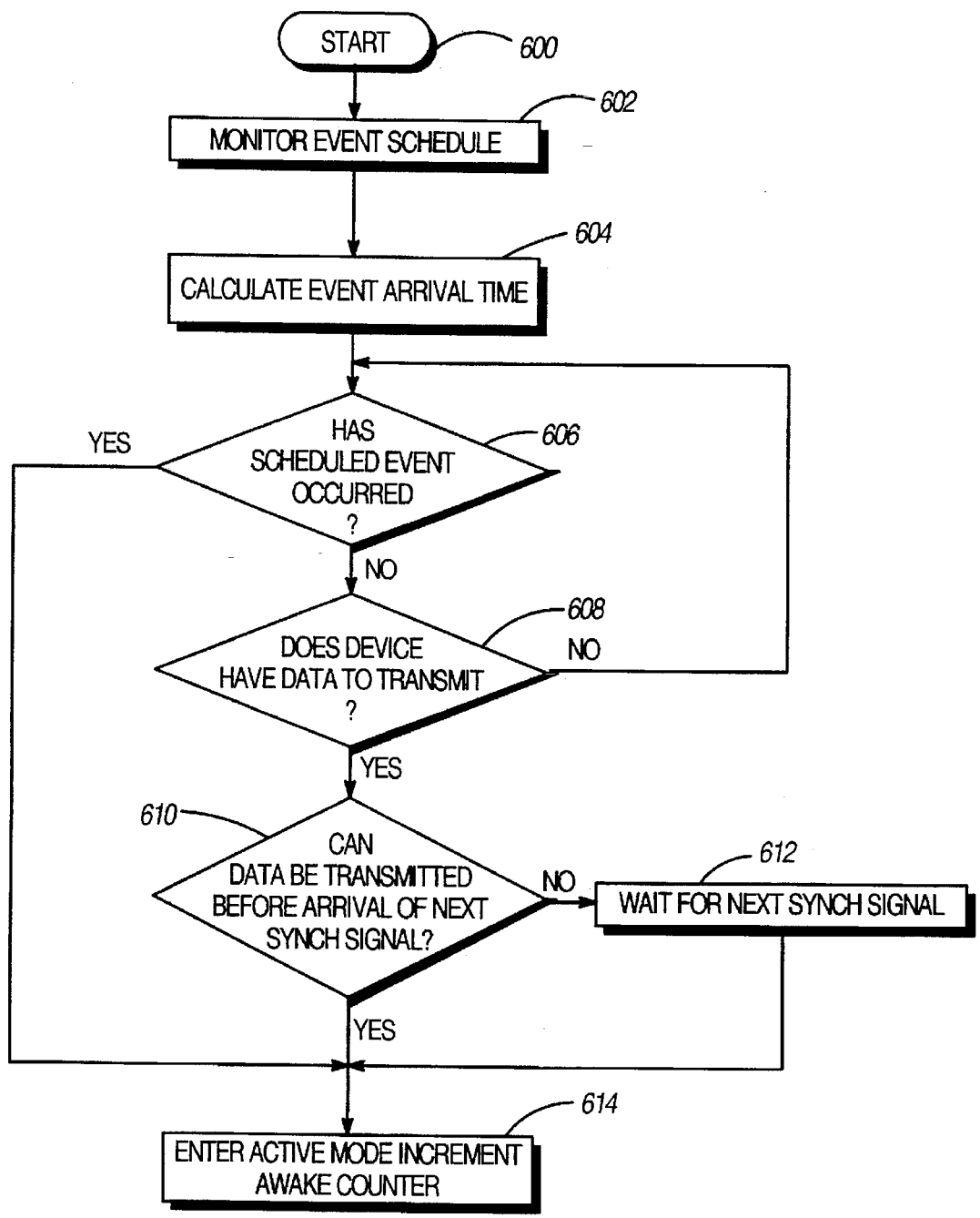
FIG. 6 is a flow chart diagram illustrating the steps performed by a user device during a transition from the sleep mode of operation to the active mode of operation.

FIG. 6 is a flow chart diagram illustrating the steps performed by MPU 220 of user device 110, while under the direction and control of a program instruction set stored in ROM 230 of FIG. 2, in order for the user device 110 to transition from the sleep mode of operation to the active mode of operation. Commencing at start block 600 it is assumed that the device is in the sleep mode of operation. Flow proceeds to block 602, where the event schedule is monitored. At block 604 the device calculates an arrival time for each Synch Signal identified in the schedule. Then at block 606 a check is performed to determine when the calculated arrival has occurred. Upon the occurrence of each of said calculated arrival times, as identified by the schedule, the user device in the sleep mode of operation, transitions to the active mode of operation at block in order to monitor the arriving synchronization signal.

Assuming the calculated arrival time has not occurred, flow proceeds from block 606 to block 608 where a check is performed to determine whether the device has information that it desires to transmit. If not, flow branches back to block 606. If, on the other hand, the device has information ready for transmission, flow proceeds to blocks 620, 621, 622 and 610 where a check is performed to determine whether the information transmission can be completed before the arrival of a next Synch Signal 310. If so, flow proceeds to block 614 where the device in the sleep mode, transitions to the active mode of operation in order to transmit the information. If, on the other hand, there is not enough time for the device to complete transmission of the information prior to the arrival of a next Synch Signal 310, flow proceeds to block 612 where the device waits for the arrival of a next Synch Signal 310 prior to proceeding to block 614. The purpose of these steps is to assure that no user devices 110 attempt to transmit data during a time when AP 120 is transmitting Synch Signals 310 thereby avoiding the possibility of radio interference and the corruption of the synchronization information within a Synch Signal 310.

Figure 7:
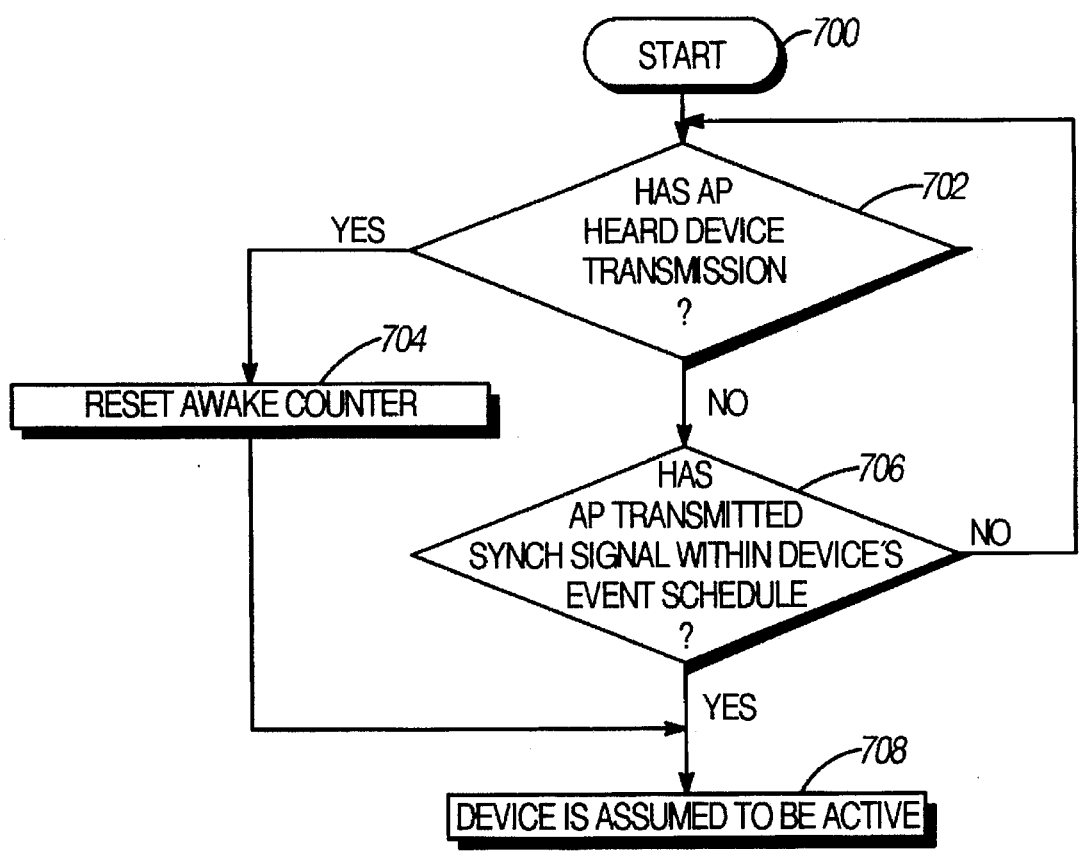
FIG. 7 is a flow chart diagram illustrating the steps performed by the access point in order to determine when a user device enters the active mode of operation.

FIG. 7 is a flow chart diagram illustrating the steps performed by MPU 220 of AP 120, while under the direction and control of a program instruction set stored in ROM 230 of FIG. 2, in order to estimate when a user device 110 enters the active mode of operation. Commencing at start block 700 it is assumed that the device in question is in the sleep mode of operation. As mentioned above, AP 120 stores in RAM 240 information comprising the event schedule for each user device 110 registered for operation within the zone of radio coverage provided by AP 120. In addition to an event schedule, AP 120 maintains an awake counter for each device. This counter is substantially identical to the counter maintained by each device as discussed in association with FIG. 5. In this fashion, AP 120 attempts to track the status of each user device 110. From block 700 flow proceeds to block 702 where a check is performed to determine whether AP 120 has heard a transmission from the device in question. If so, AP 120 will reset the awake counter associated with that device to zero at block 704. This action equates to the AP determining at block 708 that the device is now in the active mode of operation.

Returning to block 702, if no transmission from the device in question is received by AP 120, flow proceeds to block 706 where a check is performed to determine whether AP 120 has transmitted a Synch Signal 310 which corresponds to an event to be monitored by the device in question. AP 120 makes such a determination by reviewing the event schedule for the device in question, as stored in AP memory. Assuming no Synch Signal which appears as an event to be monitored by the device in question has been transmitted, flow branches back to block 702 where the process continues. If, on the other hand, a Synch Signal which corresponds to an event to be monitored by the device in question has been transmitted, AP 120 safely assumes at block 708 that the device in question is now in the active mode of operation. Of note, whenever such a determination is made, AP 120 will begin incrementing its awake counter for the device in question until it receives an indication that the device has entered the sleep mode of operation.

Figure 8:
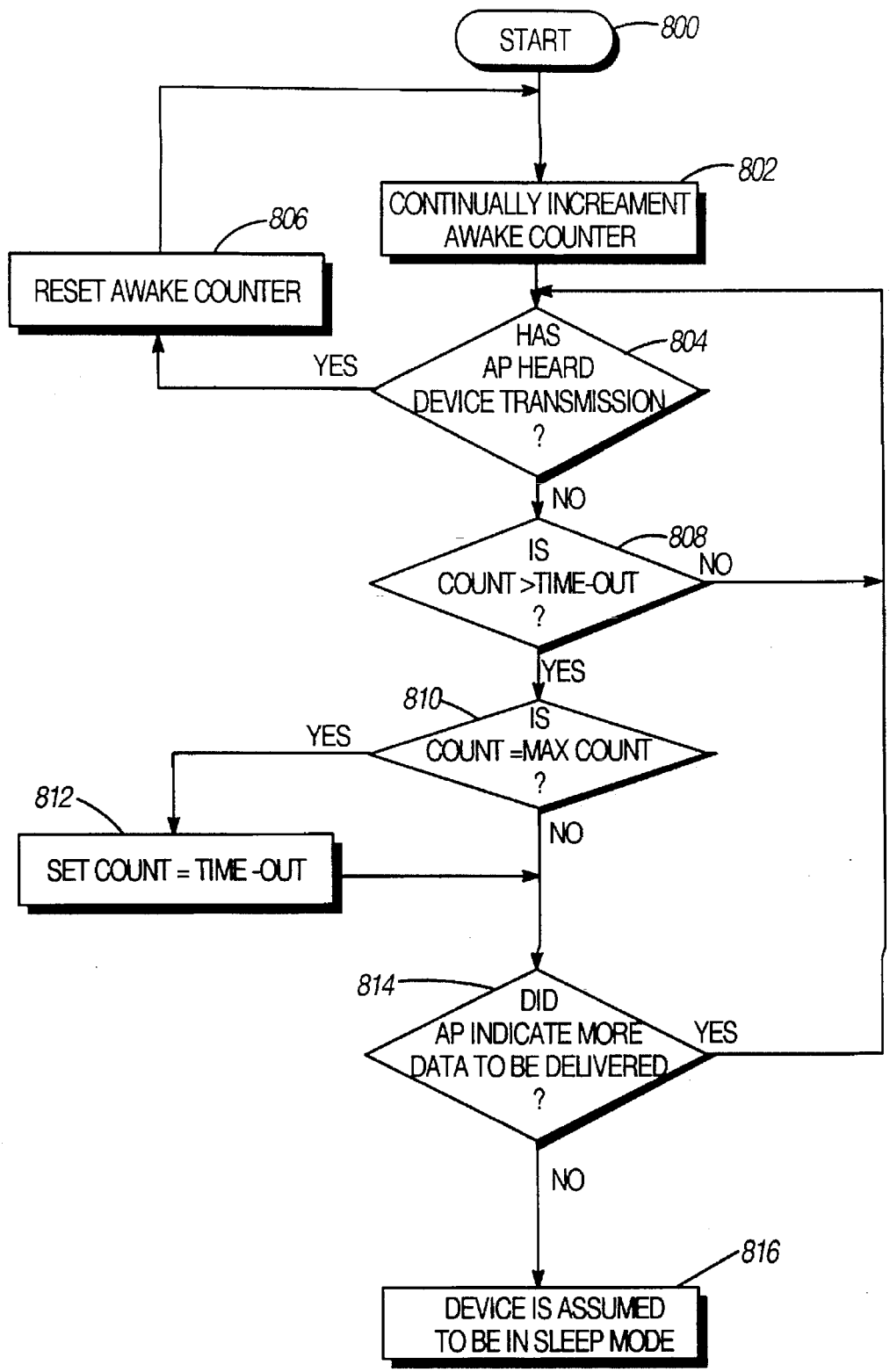
FIG. 8 is a flow chart diagram illustrating the steps performed by the access point in order to determine when a user device enters the sleep mode of operation.

FIG. 8 is a flow chart diagram illustrating the steps performed by MPU 220 of AP 120, while under the direction and control of a program instruction set stored in ROM 230 of FIG. 2, in order to estimate when a user device enters the sleep mode of operation. Commencing at start block 800 it is assumed that the device is in the active mode of operation. In accordance, the awake counter for that device, as maintained by AP 120, will be continually incrementing at block 802 as long as the device in question is presumed to be in the active mode. From block 802, flow proceeds to block 804 where a check is performed to determine whether AP 120 has received a transmission from the device in question. If so, flow proceeds to block 806 where the awake counter for that device is reset to zero and flow branches back to block 802 where the counter begins a new count. If, on the other hand, no transmissions have been received, flow proceeds from block 804 to block 808 where a check is made to determine whether the counter count is greater than a value of time-out. Assuming the count is less than the value of time-out, flow continually branches back to block 804 and the device is presumed to be in the active mode.

If, on the other hand, time-out has been reached, flow will then proceed from block 808 to block 810 where a check is performed to determine whether the counter has reached its maximum value. If so, flow branches to block 812, where the count is set to the value of time-out, per the discussion of FIG. 5 at block 514. Flow then proceeds from 812 to block 814. This operation is performed so that counter synchronization between AP 120 and the device in question is maintained.

From blocks 810 or 812, flow proceeds to block 814 where a check is performed to determine whether AP 120 transmitted information to the device in question indicating that additional information is to be transmitted. This indication may be communicated, for example, via the bit status of a Synch Signal 310, which indicates that AP 120 has additional data ready for transmission to the device in question. In addition, this indication may reside in the header of a data packet actually transmitted to the device. If so, flow branches back to block 804, where it is assumed that the device will remain in the active mode in order to receive the additional information. If no such indication has been transmitted to the device in question, flow proceeds to block 816 where AP 120 pauses the awake counter under the assumption that the device has entered the sleep mode of operation.

What is claimed is:

1. In a wireless communication system having a service access point and a plurality of mobile battery powered user devices, said user devices being in communication with each other and/or the access point via communication channels, a power management technique for determining when a user device may transfer from an active mode of operation to a sleep mode of operation, said technique comprising the steps, at the user device, of:

initializing a first awake counter, said first awake counter having a maximum count value;

determining a counter time-out value;

incrementing the first awake counter during the user device's active mode of operation;

upon counter time-out, determining whether sleep mode conditions are satisfied; and when true, entering the sleep mode and said technique comprising the steps, at the service access point, of:

maintaining a second awake counter for each device and selectively resetting and incrementing the second awake counter for a given device in response to respectively receiving a transmission and receiving no transmission from the given device.

2. In a wireless communication system having a service access point and a plurality of mobile battery powered user devices, said user device being in communication with each other and/or the access point via communication channels, a power management technique for determining when a user device may transfer from an active mode of operation to a sleep mode of operation, said technique comprising the steps, at the user device, of:

initializing an awake counter, said counter having a maximum count value;

determining a counter time-out value;

incrementing the counter during the user device's active mode of operation;

upon counter time-out, determining whether sleep mode conditions are satisfied; and when true, entering the sleep mode, wherein the step of determining whether sleep mode conditions are satisfied further comprises the steps of:

identifying a clear communications channel;

determining that no information, stored at the user device, is ready for transmission from the user device; and determining that no information, stored at the access point, is ready for transmission to the user device.

3. In a wireless communication system having a service access point and a plurality of mobile battery powered user devices, said user devices being in communication with each other and/or the access point via communication channels, a power management technique for determining when a user device may transfer from an active mode of operation to a sleep mode of operation, said technique comprising the steps, at the user device, of:

initializing an awake counter, said counter having a maximum count value;

determining a counter time-out value;

incrementing the counter during the user device's active mode of operation;

upon counter time-out, determining whether sleep mode conditions are satisfied; and when true, entering the sleep mode, further comprising the steps of:

establishing a minimum sleep period;

calculating an anticipated sleep period;

comparing the minimum sleep period to the anticipated sleep period; and entering the sleep mode when the anticipated sleep period exceeds the minimum sleep period.

4. The method of claim 2 further comprising the step of resetting the awake counter whenever the user device transmits information.

5. The method of claim 2 further comprising the steps of:

resetting the awake counter whenever the user device receives a packet addressed solely for the user device in question; and refraining from resetting the awake counter when the user device receives a packet addressed for delivery to any other device in the network.

6. The method of claim 2 further comprising the step of:

resetting the counter to the time-out value upon the counter incrementing to the maximum count value.

7. The method of claim 2 further comprising the step of inhibiting the counter while the user device is in the sleep mode.

8. In an wireless communication system having a service access point and a plurality mobile battery powered user devices, said user devices being in communication with each other or the access point, a power management technique for determining when a user device may transition from a sleep mode of operation to an active mode of operation, said technique comprising the steps of:

at the access point, transmitting a plurality of time separated synchronization signals to the plurality of user devices; and assigning sequential identification numbers to each synchronization signal; and at the user devices, establishing a schedule identifying a plurality of synchronization signals to be monitored by a user device by:

selecting a synchronization signal rate of $2^x$, where x is $0<x<8$; and monitoring every $2^x$ synchronization signal received by the user device;

calculating an arrival time for each synchronization signal identified in the schedule as a function of the time separation;

entering the sleep mode; and upon the arrival of each of said synchronization signals as identified in the schedule, causing the user device in the sleep mode to transition from the sleep mode of operation to the active mode of operation in order to monitor the synchronization signal's content.

9. The method of claim 8 wherein the step of establishing the schedule in the alternative comprises the steps of:

generating a binary shift register sequence comprising a plurality of binary symbols;

relating each binary symbol to a synchronization signal; and selecting a particular synchronization signal as a function of the binary shift register sequence.

10. The method of claim 8 further comprising the steps of:

calculating an arrival time for a next synchronization signal;

establishing a minimum transmit time;

comparing the calculated arrival time to the minimum transmit time;

permitting the user device to transition from the sleep mode of operation to the active mode of operation when the arrival time is greater than the minimum transmit time; else permitting the user device to transition from the sleep mode of operation to the active mode of operation at the arrival time of the next synchronization signal.

11. The method of claim 8 further comprising the step of informing the access point of each user device's schedule.

12. The method of claim 8 further comprising the steps of:

the access point determining when a user device is in the active mode as a function of the user device's schedule; and determining when a user device is in the sleep mode as a function of the user device's schedule.

* * * * *